(12) United States Patent  (10) Patent No.: US 8,737,555 B2
Haug et al.  (45) Date of Patent: May 27, 2014

(54) DIGITAL SIGNAL PROCESSING FOR PLC COMMUNICATIONS HAVING COMMUNICATION FREQUENCIES

(75) Inventors: Stuart L. Haug, Hackensack, MN (US); Chad Wolter, Breezy Point, MN (US); Bryce D. Johnson, Breezy Point, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 303 days.

(21) Appl. No.: 13/334,522

(22) Filed: Dec. 22, 2011

(65) Prior Publication Data

US 2013/0163644 A1     Jun. 27, 2013

(51) Int. Cl.
    *H04L 7/02*    (2006.01)
(52) U.S. Cl.
    USPC .......................................... 375/371; 375/355
(58) Field of Classification Search
    USPC .................................. 375/355, 371
    See application file for complete search history.

(56) References Cited

U.S. PATENT DOCUMENTS

| | | | |
|---|---|---|---|
| 5,535,240 A | 7/1996 | Carney et al. | |
| 5,581,229 A | 12/1996 | Hunt | |
| 6,154,488 A | 11/2000 | Hunt | |
| 6,177,884 B1 | 1/2001 | Hunt et al. | |
| 6,965,502 B2 | 11/2005 | Duffy et al. | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,346,463 B2 | 3/2008 | Petite et al. | |
| 7,432,824 B2 | 10/2008 | Flen et al. | |
| 7,443,313 B2 | 10/2008 | Davis et al. | |
| 7,468,661 B2 | 12/2008 | Petite et al. | |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,774,530 B2 | 8/2010 | Haug et al. | |
| 7,791,468 B2 | 9/2010 | Bonicatto et al. | |
| 7,877,218 B2 | 1/2011 | Bonicatto et al. | |
| 7,978,059 B2 | 7/2011 | Petite et al. | |
| 8,144,816 B2 | 3/2012 | Bonicatto et al. | |
| 8,144,820 B2 | 3/2012 | Bonicatto | |
| 8,194,789 B2 | 6/2012 | Wolter et al. | |
| 8,223,859 B2 * | 7/2012 | Heidari et al. | 375/260 |
| 8,238,263 B2 | 8/2012 | Kohout et al. | |

(Continued)

*Primary Examiner* — Kevin Kim
(74) *Attorney, Agent, or Firm* — Crawford Maunu PLLC

(57) ABSTRACT

Aspects of the present disclosure are directed toward receiver devices and methods of using receiver devices. One such method can include converting, using an analog-to-digital converter (ADC), and an analog input signal from power distribution lines that carry power using alternating current (AC) to a digital form. This input digital signal can be an oversampled digital signal, where the digital signal is oversampled relative to downstream processing (e.g., FFT-based processing). A processing circuit(s) can then be used to decimate the input digital signal according to a decimation rate. A reference signal can be generated by the processing circuit that is responsive to the decimation rate. The processing circuit can also be used to detect a change in a phase difference between the AC and reference signal and to modify, in response to detecting a change in the phase difference, the decimation rate to counteract the detected change in the phase difference.

18 Claims, 3 Drawing Sheets

(56) References Cited

U.S. PATENT DOCUMENTS

| | | |
|---|---|---|
| 2003/0053553 A1 | 3/2003 | Critchlow et al. |
| 2003/0133473 A1 | 7/2003 | Manis et al. |
| 2005/0017847 A1 | 1/2005 | Bonicatto et al. |
| 2008/0144743 A1* | 6/2008 | Alderson et al. ............ 375/324 |
| 2008/0304595 A1 | 12/2008 | Haug et al. |
| 2010/0158178 A1* | 6/2010 | Sobchak et al. ............ 375/355 |
| 2011/0121952 A1 | 5/2011 | Bonicatto et al. |
| 2011/0176598 A1 | 7/2011 | Kohout et al. |
| 2011/0218686 A1 | 9/2011 | Mchann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0087225 A1* | 4/2012 | Honma ..................... 369/59.19 |
| 2012/0106664 A1 | 5/2012 | Bonicatto et al. |

\* cited by examiner

DIGITAL SIGNAL PROCESSING FOR PLC COMMUNICATIONS HAVING COMMUNICATION FREQUENCIES

BACKGROUND

Service providers utilize distributed networks to provide services to customers over large geographic areas. For example, power companies use power distribution lines to carry power from one or more generating stations (power plants) to residential and commercial customer sites. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices customer sites.

Communications providers may utilize a distributed communications network to provide communications services to customers. Similarly, power companies utilize a network of power lines, meters, and other network elements to provide power to customers throughout several geographic regions and to receive data from customer locations including, but not limited to, data representing metered utility usage. A system can provide these reporting functions using a set of data-collecting devices (collectors) that are designed to communicate with nearby endpoint devices. However, data communication between a command center, collectors and many thousands of endpoint devices over power distribution lines can be a particularly challenging issue. The sheer number of endpoint devices contributes to a host of issues including endpoint processing power, memory size, endpoint cost, interference from AC power and other concerns. For instance, digital signal processing of communications between the devices can be complicated by these and other factors.

SUMMARY

Aspects of the present disclosure are directed to systems and methods for use with receiver circuits tracking AC frequency. These and other aspects of the present disclosure are exemplified in a number of illustrated implementations and applications, some of which are shown in the figures and characterized in the claims section that follows.

Particular embodiments of the present disclosure are directed toward a circuit-based apparatus having a transceiver circuit configured and arranged to communicate over power distribution lines that carry power using alternating current (AC). One or more processing circuits are configured and arranged to provide an analog to digital converter (ADC) module configured to generate an input digital signal from an analog signal that was received at the transceiver circuit. This input digital signal can be an oversampled digital signal, where the digital signal is oversampled relative to downstream processing (e.g., FFT-based processing). A decimator module is configured and arranged to produce, in response to a variable decimation rate, a decimated version of the input digital signal by decimating the oversampled signal to reduce the sample rate. A reference signal generator module is configured and arranged to generate a reference signal having a frequency that is responsive to the decimation rate. A decimation modification module is configured and arranged to modify, in response to an indication of change in a phase difference between the reference signal and the AC, the decimation rate to counteract the phase difference. This can be particularly useful for maintaining a tight correlation between the transmitted signal frequencies (which vary according to the AC frequency) and the signal processing (which can use an FFT with a sample rate that varies according to the AC frequency).

Other embodiments are directed toward methods of using one or more circuits of a receiver device. One such method can include converting, using an analog-to-digital converter (ADC), and an analog input signal from power distribution lines that carry power using alternating current (AC) to a digital form. This input digital signal can be an oversampled digital signal, where the digital signal is oversampled relative to downstream processing (e.g., FFT-based processing). A processing circuit(s) can then be used to decimate the input digital signal according to a decimation rate. A reference signal can be generated by the processing circuit that is responsive to the decimation rate. The processing circuit can also be used to detect a change in a phase difference between the AC and reference signal and to modify, in response to detecting a change in the phase difference, the decimation rate to counteract the detected change in the phase difference.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
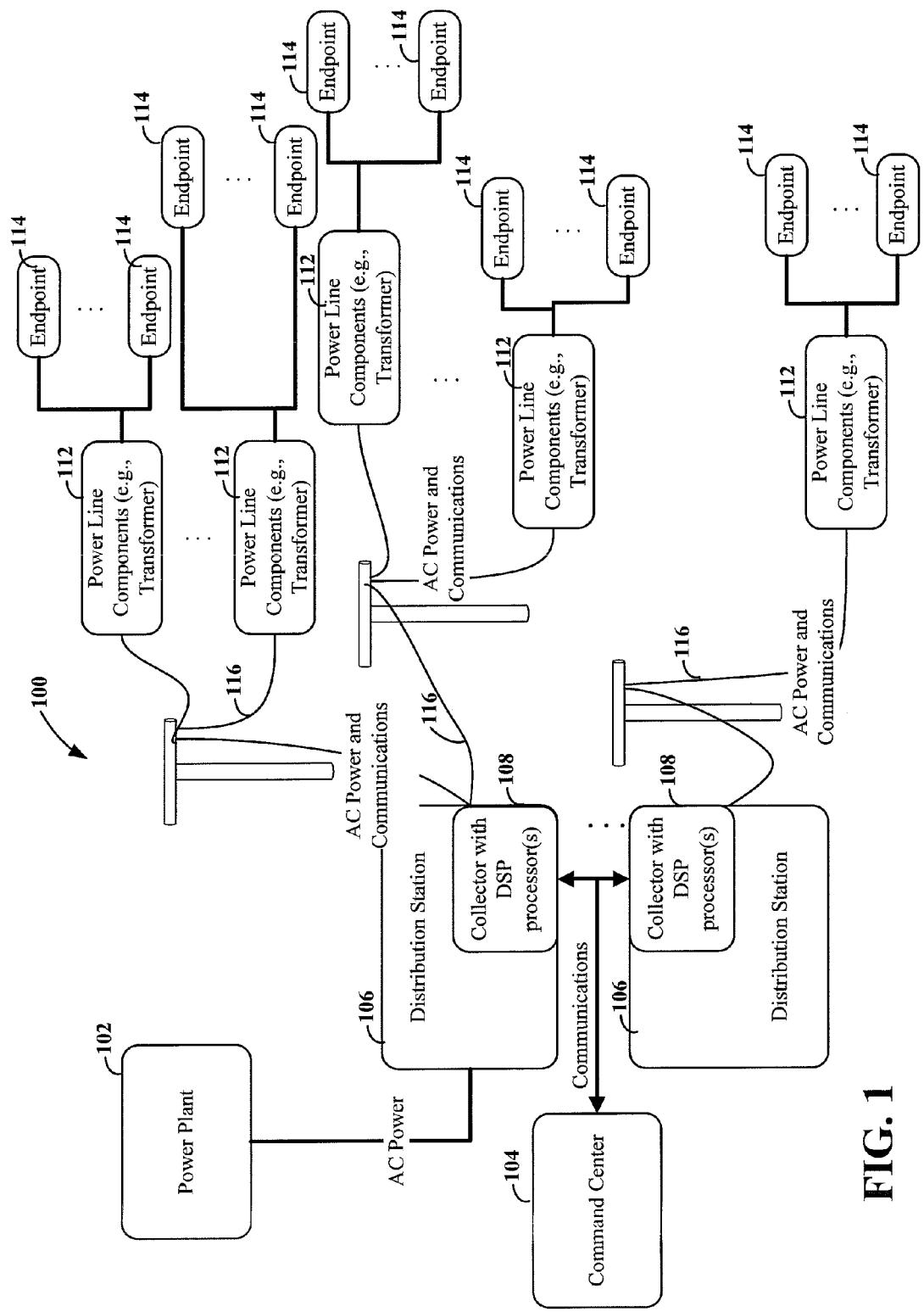
FIG. 1 is a block diagram of an example power line communication system in which endpoints communicate data with collector units, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those that may be implemented for receiver circuits communicating over power distribution lines. While the present disclosure is not necessarily limited to such applications, various aspects of the disclosure may be appreciated through a discussion of various examples using this context.

Example embodiments of the instant disclosure are directed to receiver circuits configured and arranged to process communication signals that are received over power distribution lines, which carry power using alternating current (AC). The receiver circuits can be configured to process received signals using the AC as a timing reference. The AC line frequency is subject to significant fluctuations in frequency, and the receiver is designed to compensate for these fluctuations by making appropriate adjustments to the signal processing.

Consistent with certain embodiments of the present disclosure, bandwidth demands of a complex system that communicates over power distribution lines are met using a receiver that processes a received signal in the digital domain. In particular embodiments, the signal processing includes the use of a fast Fourier transform (FFT) to allow the signal to be represented in the frequency domain. The FFT algorithm can be designed to match the channel frequencies used by the transmitter. Embodiments of the present disclosure are therefore directed toward compensating for changes in the channel frequencies that result from corresponding changes in the AC frequency.

For instance, the transmitted signals can track the AC line frequency in certain embodiments. For instance, a given frequency channel can be determined by using the AC line frequency as a reference signal or clock. In this instance, the frequency channel has a center frequency that would vary as the frequency of the AC line varies. This can be particularly useful for filtering harmonics that might be caused by the power-providing AC. This AC frequency, and resulting harmonics, can vary about an ideal frequency of about 60 Hz in the United States and around 50 Hz in Europe. These standard frequencies, however, are relatively arbitrary (e.g., defined by a standard that could be changed in the future) and do not necessarily limit the various embodiments discussed herein.

The output of an FFT can vary according to a number of input parameters. One of these parameters is the sample rate for the digital signal transformed by the FFT. Embodiments of the present disclosure are directed toward adjusting the sample rate that is provided to the FFT. The adjustment to the sample rate can be accomplished by modifying a decimation rate of the oversampled signal to counteract changes in the AC frequency.

Aspects of the present disclosure are directed toward a receiver circuit in a data-collecting device (collector) that is configured and arranged to lock its signal processing (e.g., an FFT algorithm) closely enough to the power line frequency for complex data demodulation of data received from endpoints. The ability to effectively and efficiently lock can be particularly useful for enabling a large number of densely-packed frequency channels in a limited bandwidth, where the individual channel frequencies are held to extremely tight tolerances. For instance, the instant disclosure can be particularly useful for maintaining orthogonality between subchannels throughout the system bandwidth.

In a particular embodiment, a resample rate of the upstream receiver is tightly tracked to the power line frequency (e.g., within 1 part per 10 million) and to facilitate the demodulation of the endpoint signals with an FFT-based receiver.

Particular embodiments of the present disclosure are directed toward a circuit-based apparatus having a transceiver circuit configured and arranged to communicate over power distribution lines that carry power using alternating current (AC). One or more processing circuits are configured and arranged to provide an analog to digital converter (ADC) module configured to generate an input digital signal from an analog signal that was received at the transceiver circuit. This input digital signal can be an oversampled digital signal, where the digital signal is oversampled relative to downstream processing (e.g., FFT-based processing). A decimator module is configured and arranged to produce, in response to a variable decimation rate, a decimated version of the input digital signal by decimating the oversampled signal to reduce the sample rate. A reference signal generator module is configured and arranged to generate a reference signal having a frequency that is responsive to the decimation rate. A decimation modification module is configured and arranged to modify, in response to an indication of change in a phase difference between the reference signal and the AC, the decimation rate to counteract the phase difference. This can be particularly useful for maintaining a tight correlation between the transmitted signal frequencies (which vary according to the AC frequency) and the signal processing (which can use an FFT with a sample rate that varies according to the AC frequency).

Other embodiments are directed toward methods of using one or more circuits of a receiver device. One such method can include converting, using an analog-to-digital converter (ADC), and an analog input signal from power distribution lines that carry power using alternating current (AC) to a digital form. This input digital signal can be an oversampled digital signal, where the digital signal is oversampled relative to downstream processing (e.g., FFT-based processing). A processing circuit(s) can then be used to decimate the input digital signal according to a decimation rate. A reference signal can be generated by the processing circuit that is responsive to the decimation rate. The processing circuit can also be used to detect a change in a phase difference between the AC and reference signal and to modify, in response to detecting a change in the phase difference, the decimation rate to counteract the detected change in the phase difference.

More particular embodiments of the present disclosure are directed toward a receiver device that is configured to decode orthogonal carrier frequency channels. For instance, orthogonal frequency-division multiplexing (OFDM) is a method of encoding digital data on multiple orthogonal carrier frequency channels. The orthogonal nature of the frequency channels ensures that cross-talk between the sub-channels is not present. For instance, an FFT can be constructed for a given set of orthogonal channels and such that each channel is made separable by way of being able to reject components from other channels. Aspects of the present disclosure recognize that one component of a properly-constructed FFT relates to the filling time of the FFT buffer (e.g., the time represented by a complete set of input samples). Correlating this filling time to the frequency of the channels, the FFT can reduce or eliminate "spectral leaking," which can be caused by a mismatch in this correlation. Thus, the orthogonal properties of the channels are effectively preserved at the receiver.

Specific embodiments of the present disclosure recognize that correlation mismatch can result when the channel cycles (a cycle being represented by one complete period) are not aligned with the length of filling time. If the time record contains a non-integer number of cycles, spectral leakage can occur. The receiver can be configured to use an FFT with a certain size (the size being the total number of samples). The sample rate ($f_s$) represents the number of samples per a time period (e.g., samples/second), and thus, the filling time is the FFT size divided by the sample rate. The frequency of the channels uses the AC frequency as a reference point for generating the carrier frequency channels. The receiver is therefore configured to adjust the filling time, using a variable sample rate, to maintain a correlation between the filling time and the carrier frequency channels. In particular embodiments, the variable sample rate corresponds to a resampler/decimator that reduces the sample rate of an oversampled signal by selecting samples from the oversampled signal at a variable rate. This variable rate can be thought of either as the decimation/resampling rate or as the sample rate that results from the decimation rate.

Certain aspects and embodiments of the present disclosure are directed toward receiver devices, and corresponding methods, that can determine an adjustment to the decimator rate. For instance, particular embodiments recognize that the receiver can determine the amount of the adjustment using a feedback loop. The feedback loop is designed to produce an adjustment relative to mismatches between the decimation rate and the AC frequency, thereby compensating for FFT mismatches relative to the transmitted channel frequencies. For a given AC frequency, the receiver is able to determine the desired decimation/resample rate. Accordingly, the feedback loop is configured to be responsive to the AC frequency.

In particular embodiments of the present disclosure, a reference signal is generated from the decimation/resample rate. For instance, the frequency of the reference signal can be set according to the decimation rate. More particularly, the frequency of the reference signal can be set to generate a reference signal having a frequency corresponding to the desired AC frequency for the decimation rate. The loop filter then determines the adjustment by comparing the reference signal against the AC signal to produce an adjustment that compensates for differences between the two signals. In one embodiment, the comparison includes detecting a phase relationship/difference, between the two signals. Particular embodiments recognize that an exact match between the phases is not required (e.g., zero degree offset) so long as the phase relationship is constant. Thus, the loop filter can use a derivative of the detected phase to calculate the adjustment based upon a rate of change in the phase relationship.

In certain embodiments of the present disclosure, the frequency of the reference signal can be set to a value that correlates to virtual channel carrier frequencies. The virtual channel carrier frequencies represent frequencies that match the decimation rate. These virtual channel carrier frequencies would therefore evenly fit in the FFT using a signal decimated at the decimation rate. The frequency of the reference signal can therefore be set to a reference frequency that would result in the virtual channel carrier frequencies if the reference frequency was the actual AC frequency. Thus, a frequency mismatch between the reference frequency and the AC frequency corresponds to a mismatch between the decimation rate and the actual AC frequency.

Consistent with various embodiments of the present disclosure, the power distribution lines can carry power that is provided from one or more generating stations (power plants) to residential and commercial customer sites alike. The generating station uses AC to transmit the power long distances over the power distribution lines. Long-distance transmission can be accomplished using a relatively high-voltage. Substations located near the customer sites provide a step-down from the high-voltage to a lower-voltage (e.g., using transformers). Power distribution lines carry this lower-voltage AC from the substations to the customer sites. Depending upon the distribution network, the exact voltages and AC frequencies can vary. For instance, voltages can generally be in the range 100-240 V (expressed as root-mean-square voltage) with two commonly used frequencies being 50 Hz and 60 Hz. In the United States, for example, a distribution network can provide customer sites with 120 V and/or 240 V, at 60 Hz.

FIG. 1 is a block diagram of an example power line communication system in which endpoints communicate data with collector units, consistent with embodiments of the present disclosure. The power line communication system 100 includes a service network in which a plurality of endpoints 114 are coupled (e.g., communicatively coupled) to collector units 108 over power distribution lines 116. Consistent with embodiments of the present disclosure, the endpoints 114 can provide data from utility meters. For instance, data can be provided from power meters, gas meters and water meters, which are respectively installed in gas and water distribution networks. Moreover, while the present disclosure generally refers to the endpoints 114 as providing data utility (e.g., power) metering over a power distribution network, other data can also be communicated.

The endpoints 114 can be implemented to monitor and report various operating characteristics of the service network. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

The endpoints 114 report the operating characteristics of the network over communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be transmitted using power line communication networks that allocate available bandwidth between endpoints according to an orthogonal frequency division multiple access (OFDMA) spectrum allocation technique or another channel allocation technique.

When the endpoints 114 are implemented in connection with power meters in a power distribution network, the endpoints transmit reporting data that specify updated meter information that can include measures of total power consumption, power consumption over a specified period of time, peak power consumption, instantaneous voltage, peak voltage, minimum voltage and other measurements related to power consumption and power management (e.g., load information). Each of the endpoints can also transmit other data, such as status data (e.g., operating in a normal operating mode, emergency power mode, or another state such as a recovery state following a power outage).

In some implementations, symbols (representing one or more bits representing reporting and/or the status data) are transmitted on the power distribution lines 116 over a specified symbol period. A symbol period is a period of time over which each symbol is communicated. Certain, specific embodiments, are directed toward the use of multi-tone phase shift keyed (MTPSK) symbols, although other types of modulation schemes can be used. For instance, multi-tone frequency shift keyed with relative phase (MTFSK w/θ) symbols, can also be used. For further background details on such symbols, reference can be made to U.S. Patent Publication No. 20100164615, System And Method For Relative Phase Shift Keying, application Ser. No. 12/347,052, filed Dec. 31, 2008, which is fully incorporated herein by reference.

In FIG. 1, endpoints 114 transmit symbols over communications channels to collector units 108, respectively. In certain embodiments, the endpoints 114 can be located at customer locations (e.g., buildings). Often, but not always, transformers 112 can be located near the customer locations. These transformers 112 provide a step-down in voltage before the AC power is provided to a customer. The collector units 108 can include circuitry (e.g., including one or more data processors) that is configured and arranged to communicate with the endpoints 114 over power distribution lines 116. The collector units 108 can also include circuitry for interfacing with a command center 104. The interface to the command center 104 can be implemented using a variety of different communication networks including, but not limited to, a wide-area network (WAN) using Ethernet.

According to certain embodiments of the present disclosure, the collectors are installed in distribution substations 106 and used to control bidirectional communication with both the command center 104 (e.g., located at a utility office) and endpoints 114 (e.g., located at metering locations for customer sites). Consistent with certain embodiments, the collectors 108 are built according to an industrial-grade computer specification in order to withstand the harsh environment of a substation.

In certain embodiments of the present disclosure, the collector(s) 108 are configured to receive data from many different endpoints 114 while storing the data in a local database. A collector 108 can also take action based on the data received from the endpoints 114 and transmit data received from the endpoints 114 to a command center 104. For example, in a PLC network, the command center 104 can receive data indicating that power usage is significantly higher in a particular portion of a power network than in other portions of the power network. Based on this data, the command center 104 can allocate additional resources to that particular portion of the network (i.e., load balance) or provide data to an operator of power plant 102 (i.e., specifying that there is increased power usage in the particular portion of the power network).

Consistent with certain embodiments, the command center 104 provides an interface that allows other devices to access data that has been received from endpoints 114. For example, the user devices might be owned by utility provider operators, maintenance personnel and/or customers of the utility provider. The data identifying the increased power usage described above can be provided to a user device accessible by the operator of the system 100, who can, in turn, determine an appropriate action regarding the increased usage. Additionally, data identifying a time-of-use measure and/or a peak demand measure can also be provided to user devices. Similarly, if there has been a power outage, the command center 104 can provide data to user devices that are accessible by customers to provide information regarding the existence of the outage and potentially provide information estimating the duration of the outage.

The collectors 108 can communicate to the command center 104 over a wide area network (WAN), local area network (LAN), the Internet, or other communication networks. These data networks can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks.

Symbols from a particular endpoint may be transmitted over any one of thousands of communications channels in the system. For example, each endpoint can be assigned a particular channel using OFDMA or another channel allocation technique. Channel assignments for the endpoints 114 can be stored, for example, in a communications database that is accessible to the collectors 108.

Consistent with embodiments of the present disclosure, each collector 108 can be configured to be in communication with thousands of endpoints 114 and there can be thousands of collectors 108 communicating with the command center 104. For example, a single collector can be configured to communicate with over 100,000 endpoint devices and a command center can be configured to communicate with over 1,000 collectors. Thus, there can be millions of total endpoints and many thousands of these endpoints can communicate to the same collector over a shared power distribution line. Accordingly, embodiments of the present disclosure are directed toward coordinating communications using carefully designed time-based protocols and related considerations.

For instance, collectors 108 can be designed to demodulate transmissions from endpoint devices 114 in the digital domain using one or more digital signal processors (DSPs). The DSP can include (or receive an input from) an analog-to-digital converter (ADC) that produces a digital input signal that includes signals modulated to carry data, where the modulation uses corresponding carrier frequencies. The DSP can demodulate the digital input signal to recover the data. Certain embodiments of the present disclosure relate to transforming the digital input signal into the frequency domain as part of the demodulation. More particular embodiments provide this transformation using an FFT. The FFT can be carried out on a decimated version of the digital input signal, where the decimation rate is responsive to a frequency of the AC carried on the power line. Assuming other parameters of the FFT, such as the total number of samples, are maintained, a change to the decimation rate results in a change in the time between samples. By modifying the time between samples, the FFT input sample rate is effectively shifted to account for changes in the carrier frequencies, which can be caused by changes in the frequency of the AC.

Figure 2:
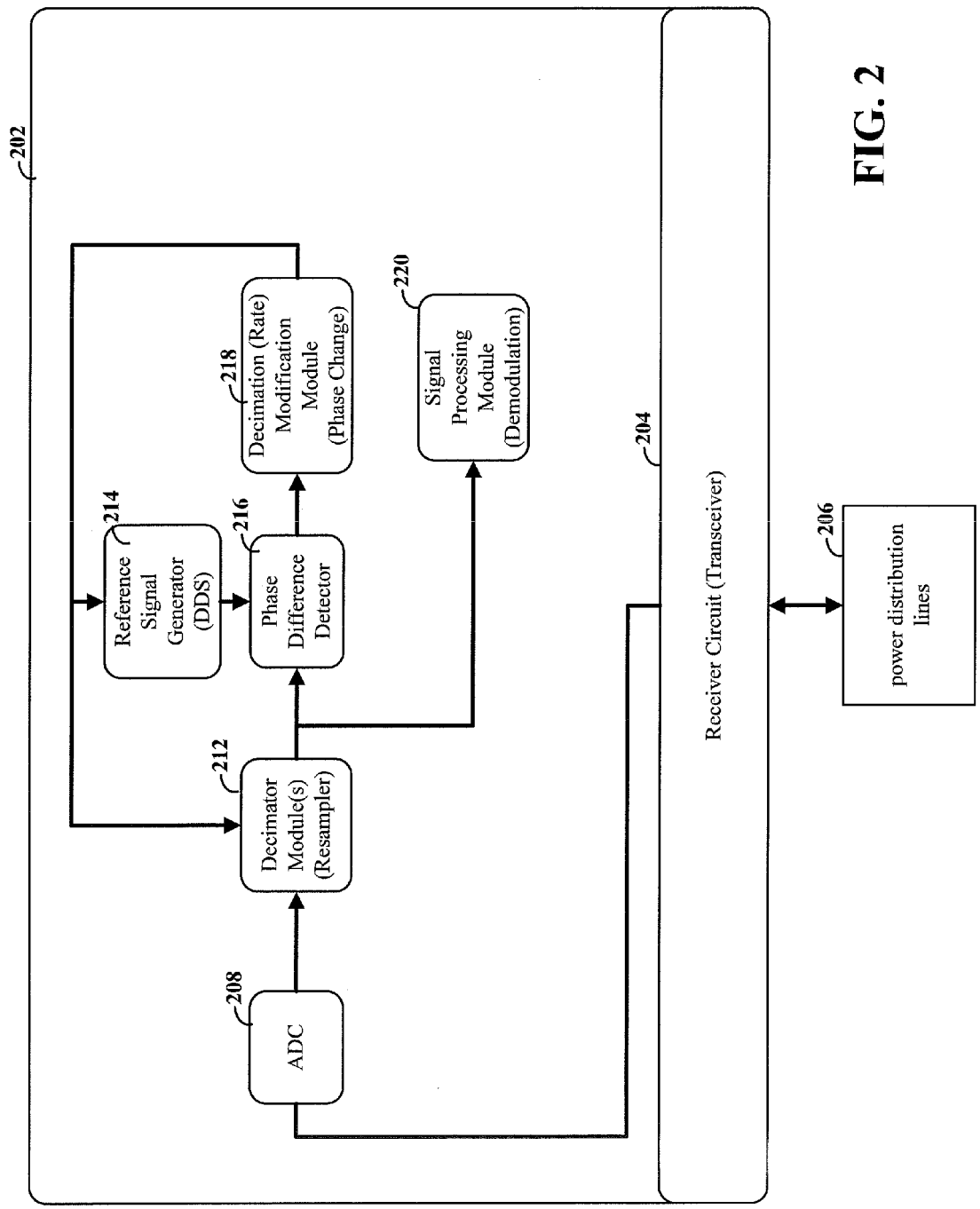
FIG. 2 depicts a block diagram for a collector device, consistent with embodiments of the present disclosure.

FIG. 2 depicts a block diagram for a collector device, consistent with embodiments of the present disclosure. Collector 202 includes a receiver circuit 204 coupled to power distribution lines 206. In certain embodiments, receiver circuit 204 can also include transmitter components, i.e., it can also be a transceiver. ADC 208 converts the signal from receiver circuit 204 into a digital form.

Aspects of the present disclosure recognize that while ADCs can provide high sample rates at relatively low costs, performing signal processing on high sample rates can be particularly burdensome. Moreover, decimating from a high (over-sampled) sample rate to a lower sample rate can provide process gains, improving the sensitivity of the receiver. Accordingly, a decimator module 212 can reduce the sample rate of the signal according to a decimation rate. The decimated signal can then be provided to a signal processing module 220. In particular implementations, signal processing module 220 uses an FFT as part of the signal processing and demodulation. For instance, the data communications can use orthogonal frequency channels to reduce or eliminate interference between channels. The FFT can be designed to preserve the orthogonal nature of the channels during the transformation when the frequency of the channels is known. For instance, the FFT can be designed with a FFT size that ensures the FFT filling time is an integer multiple of the channel periods. If the channel frequency changes, then the FFT filling time may no longer be an integer multiple of the channel periods. Accordingly, various embodiments of the present disclosure are directed toward adjustment of the filling time including, for instance, adjusting the sample rate of the samples used to fill the FFT buffer.

Consistent with embodiments of the present disclosure, the decimator module 212 is configured to operate at a variable decimation rate. Thus, a digital signal from an ADC that operates at a sample rate of N samples/second that is decimated by a varying decimation rate of M produces a signal having a sample rate of N/M. In particular embodiments, N/M sample rate is varied such that a set number of samples, at the N/M sample rate, correspond to an integer multiple of the channel periods. For instance, a symbol period used for the orthogonal channel protocols can be selected such that it is an integer multiple of the channel periods. Thus, the N/M sample rate is varied to provide a set number of samples over the symbol period.

Aspects of the present disclosure recognize that, because the channel periods are linked to the frequency of the AC, the decimation rate M can also be linked to the frequency of the AC. The ADC 208 provides the digital signal to phase difference detector 216. A reference signal generator 214 produces a reference signal that is also provided to phase difference detector 216. Consistent with embodiments of the present disclosure, reference signal generator 214 produces a reference signal that has a frequency that is responsive to the decimation rate of the decimator module 212. In more particular embodiments, the frequency of the reference signal corresponds to a frequency of the AC that would result in channel frequencies that match the decimator rate. For instance, the transmitting device can generate the channel carrier frequencies based upon the actual AC frequency $F_{AC}$. The desired decimator rate can therefore be determined as a function of the actual $F_{AC}$. The reference signal generator 214 can reverse this process and determine a desired $F_{AC}$ from the actual decimator rate. When the desired $F_{AC}$ (represented by the reference signal) matches the actual $F_{AC}$ the decimator rate can be presumed to be correct; however, a mismatch between these frequencies would indicate that the actual decimator rate should be adjusted.

Aspects of the present disclosure recognize that the actual $F_{AC}$ need not be calculated using a frequency calculation module. Rather, certain embodiments can compare the reference signal to the AC signal to determine a frequency mismatch. In particular, a phase difference detector module 216 can be used to detect a difference in phase between the two signals. This difference is then provided to decimation (rate) modification module 218.

Decimation modification module 218 determines an adjustment to the decimation rate. This adjustment is provided to both the reference signal generator module 214 and to the decimator module 212. Consistent with certain embodiments, the decimation modification module 218 is configured to respond to a change in phase difference (e.g., the derivative of the phase difference). This can be particularly useful for simplifying the adjustment process by allowing the two signals to be at any phase angle to each other, so long as the frequencies match, and the difference in the phase difference does not change.

Figure 3:
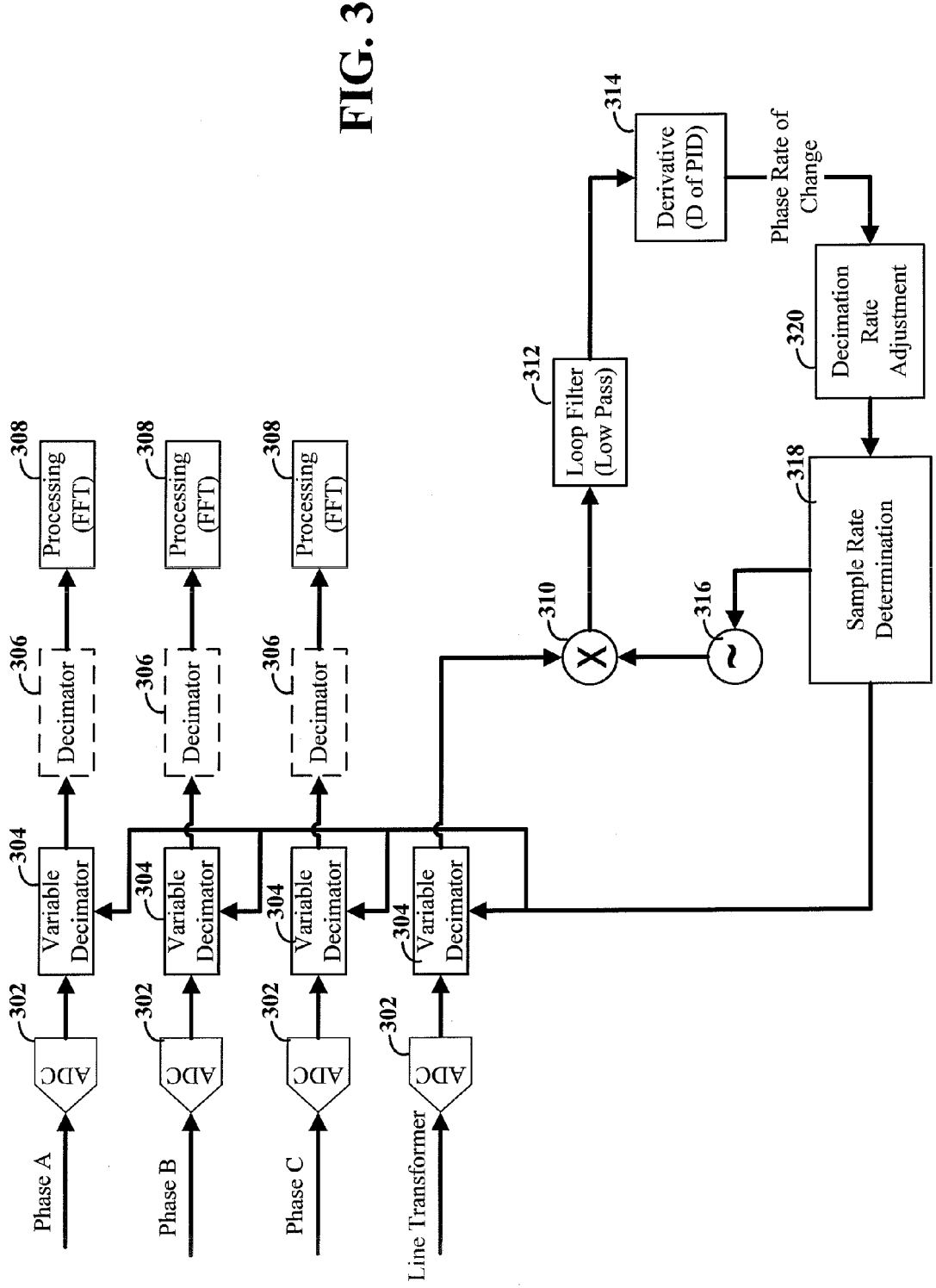
FIG. 3 depicts another block diagram for a collector device that can be placed in a distribution substation, consistent with embodiments of the present disclosure.

FIG. 3 depicts another block diagram for a collector device that can be placed in a distribution substation, consistent with embodiments of the present disclosure. Although aspects of the present disclosure are not limited to a specific power-providing standard (e.g., they can be applied to standards in different countries and likely to future revisions), power distribution substations step down AC power transmitted using three-phases. Accordingly, FIG. 3 shows ADCs 302, which are connected to a respective phase.

Consistent with embodiments of the present disclosure, the line transformer input can be used as an input for line voltage, as opposed to the Phase A, Phase B, and Phase C inputs, which are current transformer inputs used for phase currents. The Phase A-B inputs can include the communication signals from endpoints. Accordingly, each phase is monitored and used when receiving communication signals from endpoints. The AC power-providing component in these phases, however, is dependent on substation loading, which can vary significantly. The line voltage, on the other hand, generally has a more stable and predictable AC signal component. Accordingly, certain embodiments use the AC frequency from the line voltage in the control feedback loop.

ADCs 302 each produce a digital output at a high (over) sampled rate. Variable decimators (resamplers) 304 decimate these digital signals to a reduced sample rate. The decimated signals are used by processing modules 308. In certain embodiments, a fixed decimation module 306 can be implemented in addition to the variable decimators 304.

Phase detector 310 produces a signal representing the phase difference between the digital signals from the power distribution line and a reference signal produced by reference generator 316. In a particular embodiment, the reference generator 316 is a direct digital synthesizer (DDS). Accordingly, the phase detector module 310 detects any phase offset between the digitized line voltage and the reference signal. In one particular embodiment, the phase offset is detected by multiplying the two input signals together. The results can then be filtered with a filter 312 (e.g., to remove noise and frequencies above the base frequency of the AC). Filter 312 can be any of a number of different types of filter including, but not necessarily limited to, different types of low pass, high pass, notch or bandpass filters. Filter 312 can be configured and arranged to filter line harmonics and/or frequency components that are caused by signal processing element. For instance, the output of the phase detector contains the sum and difference of the two inputs, so for inputs components that are near 60 Hz, the output will be a slowly varying signal near DC superimposed with an image near 120 Hz. Other phase detector circuits are also possible, and filter 312 can be configured and arranged accordingly.

Derivative block 314 determines the rate of change for the output of the phase detector 310. In a particular embodiment, the derivative block 314 can be constructed using a proportional-integral-derivative (PID) controller module. The particular embodiment of FIG. 3 uses the derivative portion of this controller as an input to the decimation rate adjustment module 320. The decimation rate adjustment is then used by sample rate determination module 318 to determine the desired sample rate. The derivative signal represents a change in phase, and if the AC signal and the reference signal have different frequencies, they can have a phase relationship that changes over time. Once the frequencies are matched, the phase angle/difference can remain relatively constant. Accordingly, the decimation rate adjustment module 320 can be configured to provide a decimation rate adjustment that causes an adjustment to the frequency of the reference signal that counteracts the changing phase. For instance, an increasing phase angle (positive derivative value) might be counteracted by a reduction in the decimation rate. A decreasing phase angle (negative derivative value) might be counteracted by an increase in the decimation rate. This is just one example, and the particular relationship between the phase angle and the decimation rate could be set relative to how the phase angle is determined.

Consistent with embodiments of the present disclosure, the derivative module 314 operates on a portion of the output signal of the loop filter 312 that is near DC. Accordingly, the loop filter 312 can be used to remove harmonics and interference (e.g., portions of the image near 120 Hz). In one, non-limiting example, loop filter 312 can be implemented as a low pass filter, such as a 6-pole Butterworth low pass filter. One consideration for selection of the filter is reduction of the group delay while also increasing the attenuation at the harmonics (120 Hz). For instance, a corner frequency (e.g., 27.5 Hz) can be selected to optimize group delay versus attenuation. The particular values, including the corner frequency, are readily adjustable depending upon the specific application.

Consistent with certain embodiments of the present disclosure, the amplitude of the line voltage input is pre-scaled (as is the reference signal) to produce an output of the loop filter 312 that is between −1.0 and +1.0. This effectively normalizes the signal that is provided to the derivative module. Such normalization can be particularly useful in applications that use a PID controller module, e.g., by simplifying the loop gain processing.

Other embodiments are directed toward the use of one, or both of, the proportional and integral outputs of the PID controller module as part of the feedback control loop. The additional output(s) can be particularly useful for achieving a rapid acquisition/lock to the AC frequency and/or providing improved long teem accuracy. Aspects of the present disclosure, however, recognize that using the proportional and integral parts of the PID feedback can complicate tuning of the loop, and can sometimes increase instability.

In one embodiment, the output of the decimation rate adjustment module 320 can be determined by multiplying the output of the derivative module 314 by a gain factor. More involved algorithms can also be used as desired.

In a particular example and experiment embodiment, the frequency reference signal can be controlled by varying its sample rate, but regardless of output frequency, the reference signal generator 316 always produces the same set number of cycles in a set number of samples. This results in the same number of input samples for the FFTs in the set number of cycles. More particularly, the same decimation rate that drives the sample rate for the reference signal generator 316 also drives the sample rate for the decimation (re-sampling) of the Phase A, Phase B, and Phase C by variable decimator modules 304. For instance, the AC frequency tracking re-sampled rate can be represented by the algorithm A/((A*G*H)/(D*E*actual AC frequency)), where: A=(crystal-based) sample rate of the input digital signal; D=a fixed decimator rate; E=the number of FFT input samples; G=the symbol period; and H=the nominal frequency of the AC. A number of different values can be selected as may be appropriate for applications (e.g., relative to processor throughput, available memory and/or communication bandwidth). An optimal solution for a given application can also be based on transmitter power, channel noise, and desired bit error rate. These factors can be particularly relevant to selection of a symbol period and the related number of reference DDS output cycles per symbol period.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software. Accordingly, the various components and processes shown in the figures can be implemented in a variety of circuit-based forms, such as through the use of data processing circuit modules.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations and mechanisms. One such technique is the description of an implementation of a technique expressed in terms of an algorithm or mathematical expression. While such techniques may be implemented, for example, by executing code on a computer, the expression of that technique may be conveyed and communicated as a formula, algorithm, or mathematical expression.

For example, block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on particular circuits and/or software code to implement one or more of the various modules. Such modifications and changes do not depart from the true spirit and scope of the present disclosure, including aspects set forth in the following claims.

What is claimed is:

1. A circuit-based apparatus comprising:
    a transceiver circuit configured and arranged to communicate over power distribution lines that carry power using alternating current (AC);
    one or more processing circuits configured and arranged to provide
        an analog to digital converter module configured to generate an input digital signal from an analog signal that was received at the transceiver circuit;
        a decimator module configured to produce, in response to a variable decimation rate, a decimated input digital signal;

a reference signal generator module configured to generate a reference signal having a frequency responsive to the decimation rate; and a decimation modification module configured and arranged to modify, in response to an indication of change in a phase difference between the reference signal and the AC, the decimation rate to counteract the phase difference.

2. The circuit-based apparatus of claim 1, wherein the reference signal generator module is configured and arranged to generate the reference signal using a direct digital synthesizer.

3. The circuit-based apparatus of claim 1, wherein the decimator module is configured and arranged to set the decimation rate to a fixed number of FFT input samples per each period of the AC.

4. The circuit-based apparatus of claim 1, wherein the decimation modification module is configured and arranged to set the decimation rate to a fixed number of FFT input samples per each transmitted symbol.

5. The circuit-based apparatus of claim 1, further including a signal processing module configured and arranged to demodulate the decimated input digital signal.

6. The circuit-based apparatus of claim 1, further including a signal processing module configured and arranged to demodulate the decimated input digital signal according to an orthogonal frequency division multiple access (OFDMA) spectrum allocation technique.

7. The circuit-based apparatus of claim 1, wherein the one or more processing circuits are further configured and arranged to provide the modules in parallel for multiple channels that have different carrier frequencies.

8. The circuit-based apparatus of claim 1, wherein the one or more processing circuits are further configured and arranged to provide a derivative module configured and arranged to produce the indication of change in a phase difference between the reference signal and the AC.

9. The circuit-based apparatus of claim 1, wherein the one or more processing circuits are further configured and arranged to provide a proportional-integral-derivative (PID) controller module and wherein the PID controller module is configured and arranged to produce the indication of change in a phase difference between the reference signal and the AC.

10. The circuit-based apparatus of claim 1, wherein the one or more processing circuits are further configured and arranged to provide a fixed decimation module that decimates the input digital signal according to a fixed decimation rate.

11. A method comprising:
converting, using an analog-to-digital converter (ADC), an analog input signal from power distribution lines that carry power using alternating current (AC) to a digital form;
using a processing circuit to
    decimate the input digital signal according to a decimation rate;
    generate a reference signal that is responsive to the decimation rate;
    detect a change in a phase difference between the AC and reference signal; and
    modify, in response to detecting a change in the phase difference, the decimation rate to counteract the detected change in the phase difference.

12. The method of claim 11, wherein using a processing circuit to decimate the input digital signal includes producing a decimated signal having a sample rate that accounts for frequency changes in carrier channel frequencies that are caused by corresponding changes in a frequency of the AC.

13. The method of claim 11, wherein using a processing circuit further includes detecting a change in a phase difference by multiplying a decimated input digital signal with the reference signal.

14. The method of claim 11, wherein using a processing circuit further includes detecting the change in the phase difference by multiplying a decimated input digital signal with the reference signal and applying a filter to an output of the multiplication.

15. The method of claim 11, wherein using a processing circuit further includes generating the reference signal by setting a frequency of the reference signal to a value that correlates virtual carrier channel frequencies for the frequency of the reference signal with the decimation rate.

16. The method of claim 11, wherein using a processing circuit further includes demodulating symbols modulated according to one of multi-tone phase shift keyed, and multi-tone frequency shift keyed, and wherein the demodulation uses the decimated input digital signal.

17. The method of claim 11, wherein using a processing circuit further includes demodulating the decimated input digital signal according to an orthogonal frequency division multiple access (OFDMA) spectrum allocation technique.

18. The method of claim 11, wherein using a processing circuit further includes modifying the decimation rate to counteract spectral leaking due to a mismatch in an FFT filling time and carrier channel frequencies.

* * * * *